United States Patent
Boudreau et al.

[11] Patent Number: 5,905,831
[45] Date of Patent: *May 18, 1999

[54] PASSIVE ALIGNMENT FRAME USING MONOCRYSTALLINE MATERIAL

[75] Inventors: Robert Addison Boudreau, Hummelstown; Terry Patrick Bowen, Etters; Hongtao Han, Mechanicsburg, all of Pa.

[73] Assignee: The Whitaker Corporation, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/674,770

[22] Filed: Jun. 28, 1996

Related U.S. Application Data

[60] Provisional application No. 60/000,777, Jun. 30, 1995.

[51] Int. Cl.⁶ .................................................. G02B 6/36
[52] U.S. Cl. ................................ 385/88; 385/89; 385/92; 385/83
[58] Field of Search ................................ 385/88–94, 14, 385/49, 83

[56] References Cited

U.S. PATENT DOCUMENTS

| | | | |
|---|---|---|---|
| 4,210,923 | 7/1980 | North et al. | 357/30 |
| 4,802,727 | 2/1989 | Stanley | 350/96.2 |
| 4,904,036 | 2/1990 | Blonder | 350/96.11 |
| 5,073,003 | 12/1991 | Clark | 385/33 |
| 5,077,878 | 1/1992 | Armiento et al. | 29/25.02 |
| 5,179,609 | 1/1993 | Blonder et al. | 385/89 |
| 5,182,782 | 1/1993 | Tabasky et al. | 385/89 |
| 5,412,748 | 5/1995 | Furuyama et al. | 385/92 |
| 5,420,953 | 5/1995 | Boudreau et al. | 385/88 |
| 5,481,629 | 1/1996 | Tabuchi | 385/14 |
| 5,533,158 | 7/1996 | Han et al. | 385/88 |
| 5,555,333 | 9/1996 | Kato | 385/89 |

FOREIGN PATENT DOCUMENTS

| | | | |
|---|---|---|---|
| 0 226 296 | 6/1987 | European Pat. Off. . | |
| 0 304 118 | 8/1987 | European Pat. Off. . | |
| 0 532 469 A1 | 3/1993 | European Pat. Off. . | |
| 4 301 236 | 3/1994 | Germany . | |
| 55-157277 | 6/1980 | Japan . | |
| 59-185306 | 10/1984 | Japan | 385/49 |
| 63-239890 | 10/1988 | Japan | 385/88 |
| 2-4204 | 1/1990 | Japan | 385/49 |
| 5-249340 | 9/1993 | Japan | 385/49 |
| 6-118262 | 4/1994 | Japan | 385/88 |

OTHER PUBLICATIONS

Merriam Webster Inc., "Wbetter's Ninth New Collegiate Dictionary", 1986, pp. 1,2 and 538.
"Optoelectronic Integration: Physics, Technology and Applications", O. Wada (Ed.) Kluwer Academic Publishers, 1994, pp. 414–417; and pp. 113–119.

*Primary Examiner*—John Ngo
*Attorney, Agent, or Firm*—William S. Francos

[57] ABSTRACT

An apparatus for coupling an optical fiber to an optical device comprises a substrate and a passive alignment member. The substrate having a top surface and a bottom surface. The top surface having a fist groove disposed thereon for holding an optical fiber, and a second groove disposed on the top surface. The second groove being substantially orthogonal to the first groove. The passive alignment member disposed in the second groove. The passive alignment member having selectively etched forward and side pedestals for aligning the optical device to the optical fiber disposed in the first groove.

17 Claims, 7 Drawing Sheets

PASSIVE ALIGNMENT FRAME USING MONOCRYSTALLINE MATERIAL

This application claims the benefit of U.S. Provisional Application No. 60/000,777, filed of the Jun. 30, 1995.

FIELD OF THE INVENTION

The invention of the present disclosure relates to a collinear passive alignment apparatus for aligning both active and passive optical devices on a monocrystalline material.

BACKGROUND OF THE INVENTION

This invention is related to U.S. Pat. No. 5,420,953 assigned to the assignee of the present invention.

The use of monocrystalline materials has enabled the passive alignment of optical devices to optical fiber for optical communication. The use of such materials to replace the requirements for active device alignment has great potential to effect the low cost, large production of optical links that have application to Fiber to the Home (FTTH) and Fiber to the Office (FTTO). Accordingly, the recent past has seen a great deal of interest and inventive activity in the development of passive alignment based on the use of monocrystalline materials. A common material for such use is monocrystalline silicon, as its crystalline properties are well known in the art. In U.S. Pat. No. 4,210,923 to North, et al., typical techniques for etching silicon is disclosed, and the disclosure of the North, et al. patent is specifically incorporated herein by reference.

One of the preferred set of devices in the optical communication technology is the surface emitting and detecting device. To this end, the use of devices such as Vertical Cavity Surface Emitting Lasers (VCSELS) and photodetectors (such as PIN photodiodes) that have the photosensitive surface to receive or emit light on the top surface has required a great deal of modification to effect the alignment of the device to an optical fiber. In general, to effect the alignment between the device and the fiber using a silicon optical bench, it is required to have the device on a different plane that the fiber, with the light being communicated therebetween by a reflective surface. Examples of such techniques are found for example in U.S. Pat. Nos. 5,073,003 and 4,904,036, to Clark and Blonder, respectively, the disclosures of which are specifically incorporated herein by reference. While such technology has its merits in allowing passive alignment to some extent, it is nonetheless required that the device be actively aligned into position so that light is properly reflected by the reflective surface. Furthermore, the use of a reflective surface decreases coupling efficiency, since there are intrinsic losses incurred at each optical surface through dispersive effects. Accordingly, a more efficient system would allow for in-line coupling between the fiber and the device.

U.S. Pat. No. 5,179,609 to Blonder, et al. discloses an example of the use of silicon waferboard technology to effect the coupling between the device and the fiber in a co-linear fashion. The disclosure of this patent is specifically incorporated herein by reference. This reference makes use of two pieces of monocrystalline material as mounting members that have etched therein detents in complimentary locations on each of the pieces of the mounting members. These detents receive microspheres to effect the alignment of the mounting members to effect the coupling of the device to the fiber. While the reference does disclose the use of other types of alignment fiducials, there are two substantive drawbacks to the invention disclosed in this reference. To effect alignment, there is required a separate member for holding the device to be coupled to the fiber, and another member to hold the optical fiber. Furthermore, the alignment fiducials are separated piece parts that are placed between the waferboard holding the fiber and the waferboard holding the device.

As can be readily appreciated from a study of the disclosure of this reference, the alignment fiducials are an additional processing step requiring additional parts to effect alignment. Furthermore, the alignment fiducials of this reference are a potential source of misplacement and thereby misalignment of the members. Accordingly, what is needed is an apparatus that allows for direct attachment of the optical fiber and the device to a single alignment member. Furthermore, what is needed is an apparatus that enables passive alignment via alignment pedestals and standoffs that are integrally formed from and on the single alignment member. The alignment therebetween is thereby made simply and effectively at a lower cost in manufacture.

SUMMARY OF THE INVENTION

The present invention relates to a simple but fundamentally different way of aligning optical fibers and devices on monocrystalline material. To this end, a passive alignment frame has an etched surface for receiving an optical fiber for attachment therein. Also disposed on the passive alignment frame are alignment pedestals and standoffs that are formed or the frame by reactive ion etching. The pedestals allow for ready and accurate placement and bonding of the device to be coupled to the fiber. The device and the fiber are aligned and coupled passively. In the preferred embodiment, the device and the fiber are bonded to the passive alignment frame which is then readily packaged without substantial limitation. In another embodiment, the fiber is bonded first to a groove disposed on a substrate, and the surface emitting/receiving device is mounted on the passive alignment frame which is then mounted on the substrate and passively aligned to the fiber. Metallization is also provided on the passive alignment member (PAM) for electrical connection between the device and external circuitry.

Objects, Features and Advantages of the Invention

It is an object of the present invention to passively align an optical fiber with a surface emitting or receiving device in a collinear fashion.

It is a further object of the present invention that the fiber and the device are bonded to a passive alignment member and passively aligned, forming an integral unit.

It is a feature of the present invention to effect the collinear alignment of the optical device to the surface emitting or receiving device by the use of a single passive alignment member made of monocrystalline material selectively etched to effect the passive alignment of an optical device to an optical fiber.

It is a further feature of the present invention that the proper placement of the device to effect accurate passive alignment is effected by pedestals that are integrally formed from the single passive alignment member.

It is a further feature of the present invention that the selectively etched alignment pedestals are placed to efficiently locate the surface emitting/detecting optical device to two degrees of freedom, with the passive alignment member locating the third degree of freedom.

It is an advantage of the present invention that the passive alignment members can be fabricated in large quantity and simultaneously from a single wafer by simultaneous processing techniques.

DETAILED DESCRIPTION OF THE PREFERRED EMBODIMENTS

Figure 1:
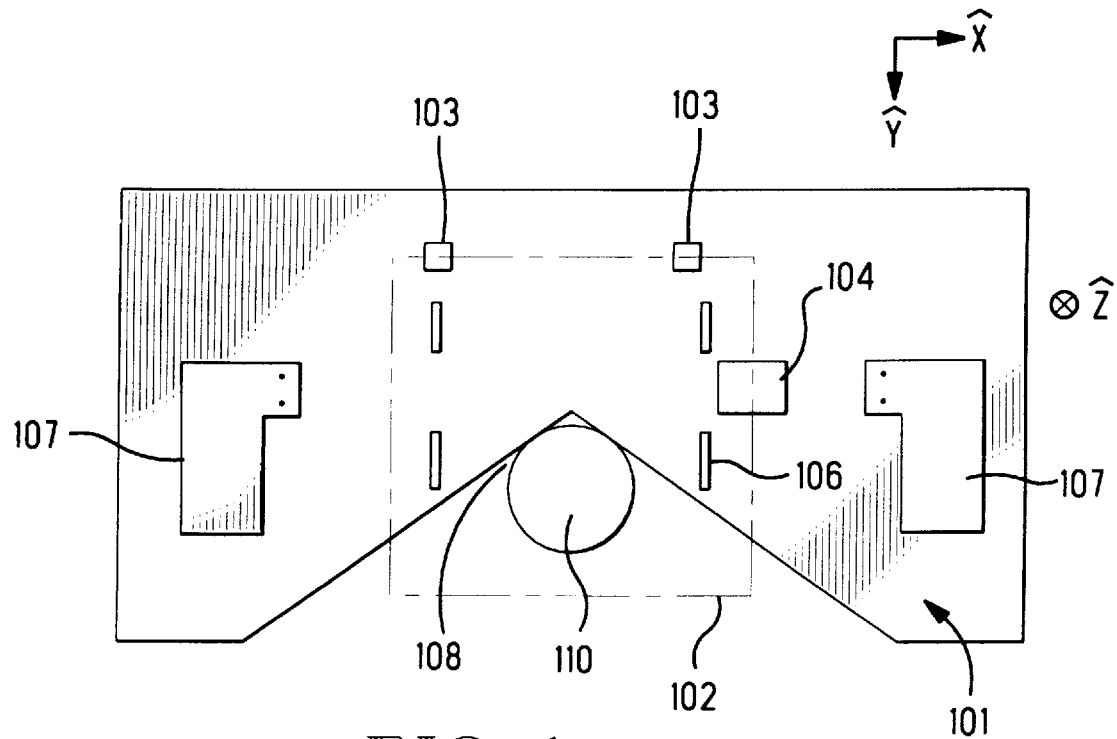
FIG. 1 is an end view of the passive alignment member (PAM) with the optical device mounted on a front surface, and the optical fiber mounted in a groove received from the rear surface of the PAM.

Turning to FIG. 1, we see an end view of the passive alignment member (PAM) 101 having disposed thereon an optical device 102 and an optical fiber 110 disposed therein (shown in outline form). There is also shown in FIG. 1, the forward alignment pedestals 103, and the side alignment pedestals 104 which enable the accurate placement of the device 102. The device 102 is application driven, and is envisioned to be a VCSEL, a p-i-n photodiode or a hologram used for various applications such as focusing or wavelength division multiplexing. The particular device utilized need only be a surface emitting or receiving device. Finally, the metalization for effecting electrical connection 107 as well as the optional alignment standoffs 106 are shown. The apparatus in final mounted form is shown in FIGS. 3 and 4 in perspective view.

Figure 2:
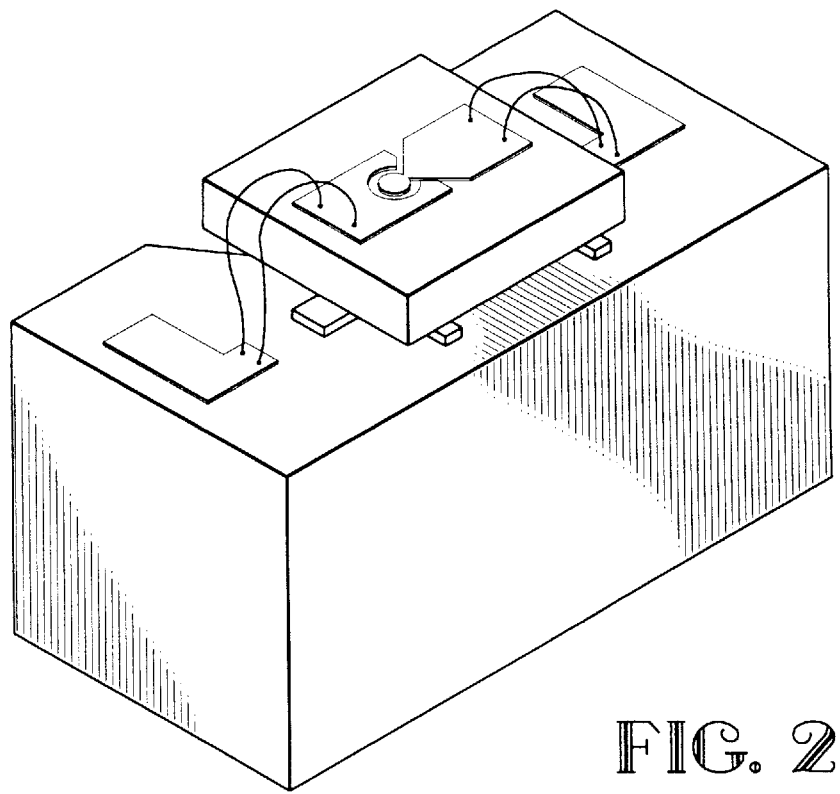
FIG. 2 is a perspective view of the PAM shown in endview in FIG. 1 having the device mounted thereon.
Figure 6:
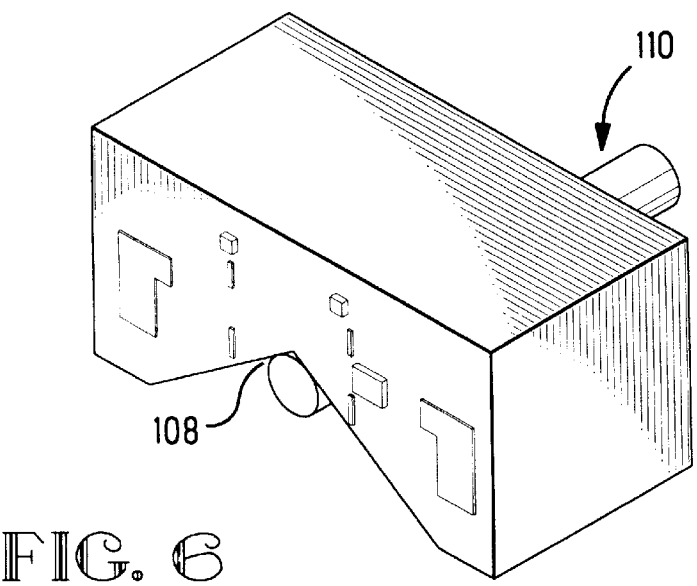
FIG. 6 shows the placement of the fiber in the PAM for single fiber application.

The basic essence of the present invention is that the surface emitting/receiving device 102 can be passively aligned to the fiber to submicron precision using the inside edges of the passive alignment member. Turning to FIGS. 1 and 2, we see the preferred embodiment of the present invention. To this end, the alignment of the device 102 is effected by the alignment pedestals 103 and 104. As can be seen in FIG. 2, the device 102 is etched by RIE to have notches to receive the pedestals. In this way the device is precisely positioned with respect to the groove 108 of the PAM 101. Thereafter, the fiber 110 is seated in the groove 108 and the device 102 is aligned passively to the fiber 110. The device is then bonded to the PAM by solder reflow, and the vertical standoffs 106 are used optionally in cases where solder on the device would impede its emission/reception of light. The geometry of the PAM having the fiber inserted therein and the device 102 missing is as shown in FIG. 6. As can be seen from a review of FIGS. 1 and 6 in particular, the optical fiber is disposed in the groove 108 and the device 102 is thereby oriented orthogonally with respect to the optical fiber 110.

Figure 3:
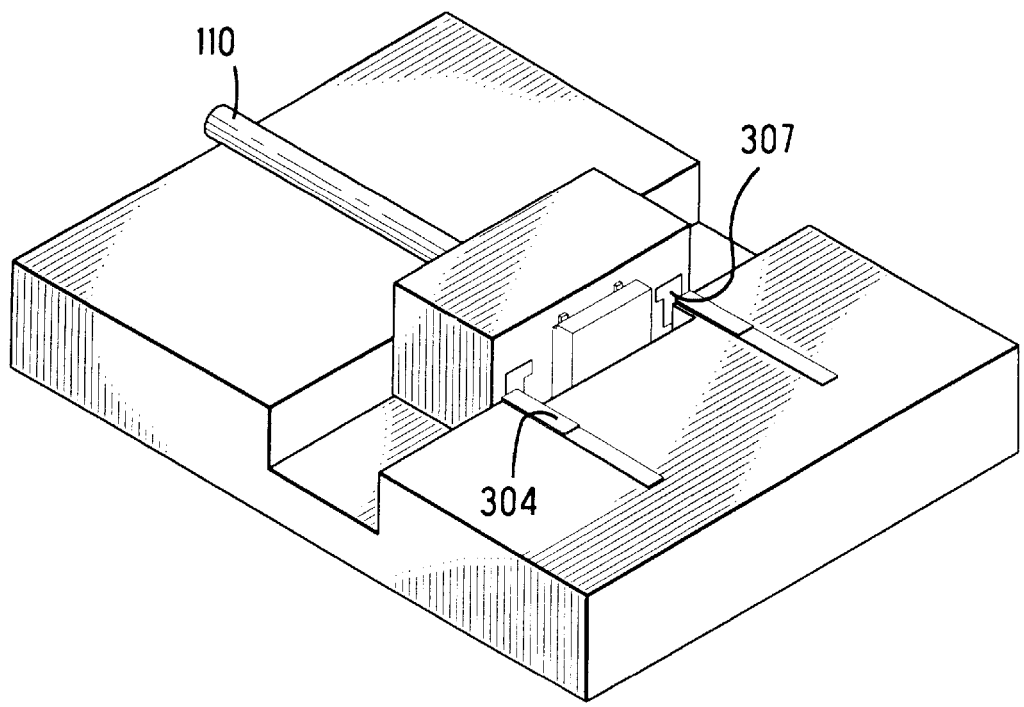
FIGS. 3 and 4 are perspective views of a single fiber-device coupling an alternative embodiment of the present invention.
Figure 4:
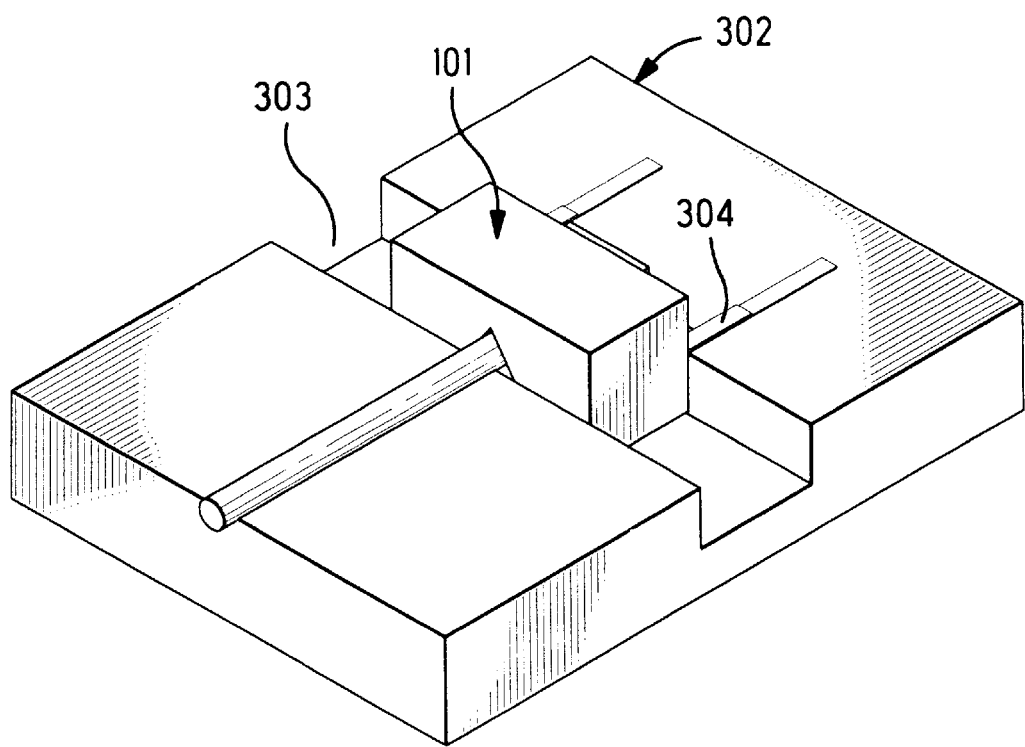
Figure 7:
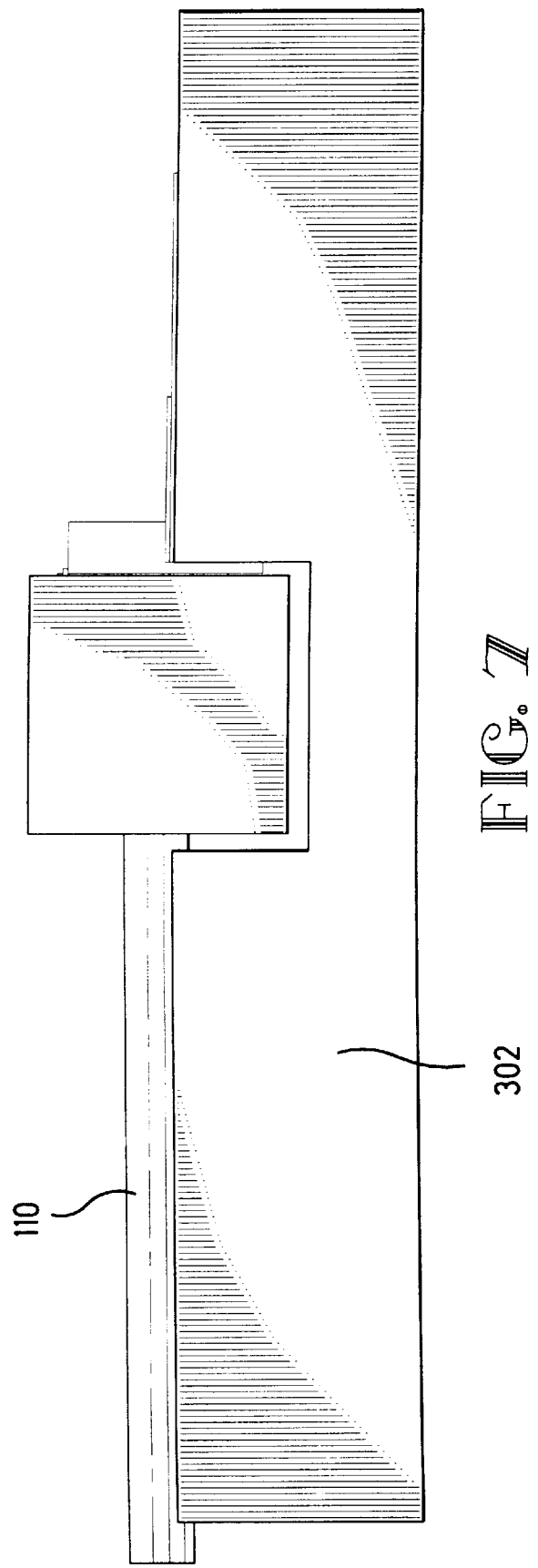
FIG. 7 is a side view of the single device PAM mounted in the groove of the substrate with the fiber mounted therein.

In an alternative embodiment shown in FIGS. 3 and 4, the optical fiber 110 is shown mounted in a v-groove (not shown) that is etched by standard technique in the monocrystalline material that forms the substrate 302. Preferably, the substrate is made 100 Si and is etched by wet etching techniques as is discussed in the reference to North, et al. discussed supra. The PAM 101 is mounted in a cavity 303 in the substrate. This cavity is formed by diamond saw cutting in the substrate in a perpendicular fashion to the direction of the v-shaped groove that holds the fiber 110. Finally, the electrical connections for making contact between the device 102 and external electronics (not shown) is through the metalization 304 via metalization 107. As can be readily appreciated from a study of FIG. 6, the fiber 110 is readily aligned in the PAM. To be clear, the fiber is bonded in the v-groove on the substrate. The fiber is thus placed in a well determined relationship with the groove 303, and thereafter the PAM is mounted in a well determined relationship in the groove, seating the fiber in its groove 108. The device is thereby passively aligned to the fiber. In order to create the final assembly linking the device 102 to the fiber for communication, the fiber 110 is bonded to the v-groove as is shown in FIGS. 3,4 and 7. The bonding can be effected by soldering or other techniques such as electrostatic bonding techniques, as disclosed in U.S. patent application Ser. No. 08/269,302, which is now U.S. Pat. No. 5,553,158 Electrostatic Bonding of Optical Fibers to Substrates", and by solder techniques such as are described in U.S. patent application Ser. No. 08/269,300 "Solder Attachment of Optical Fiber to Semiconductor Waferboard." Both of these applications were filed Jun. 30, 1994 and are assigned to the assignee of the present invention. Finally, it is important to note that in addition to this bonding techniques, adhesives such as commercial are possible as bonding agents, and that all of the bonding techniques mentioned above are useful in bonding the fiber to the PAM as well as the substrate. The silicon substrate has a saw cut groove in the surface as shown at 303. The PAM having the device 102 mounted thereon are placed in the groove 303 and the fiber 110 then fi s through the v-groove 108 effected as described above. This is shown clearly in FIG. 6. The fiber is thereby passively aligned to the device 102. The PAM 101 may then be readily bonded to the groove 303 by presolder in the groove. Solder may also be placed on the contact areas 107 and 304 to enable electrical connection following reflow between the PAM and the silicon waferboard via the groove 303.

Figure 5:
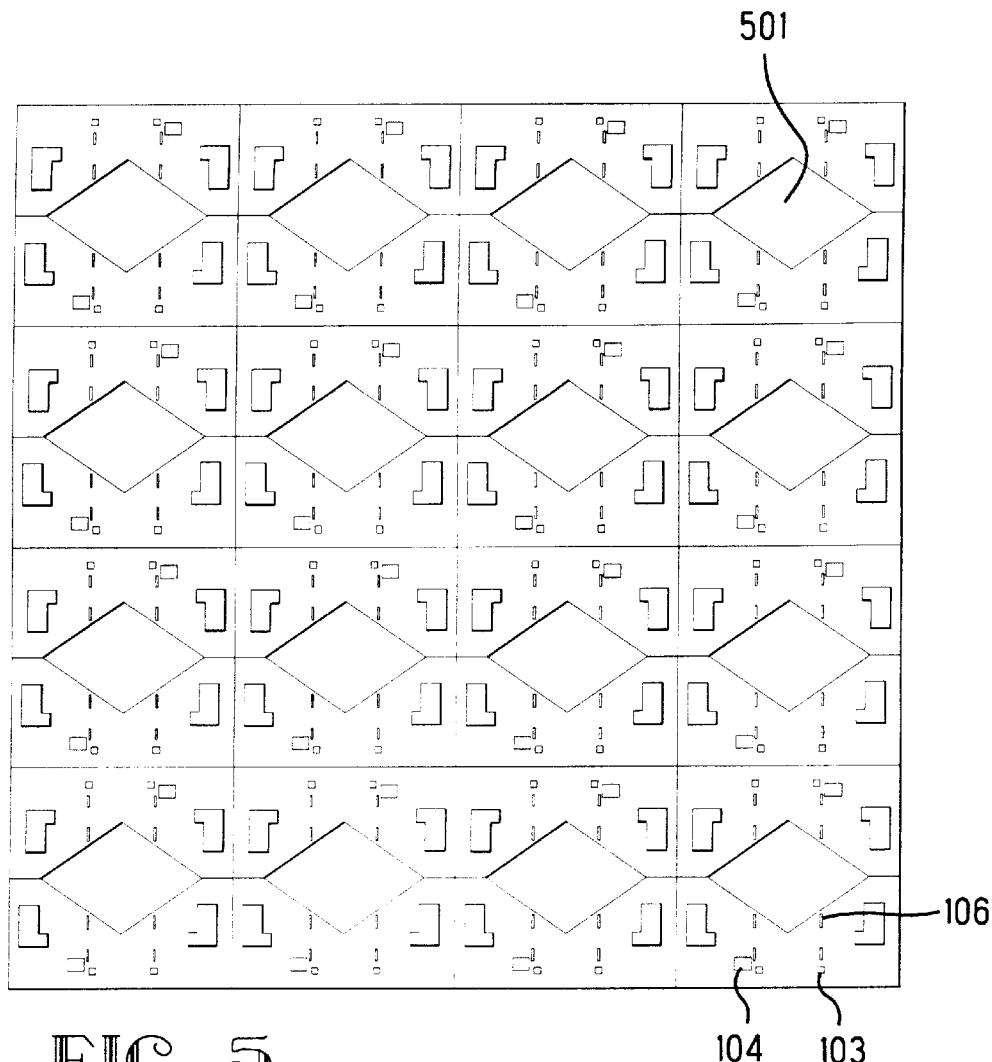
FIG. 5 is an endview of a section of a wafer having been processed by the present invention to fabricate multiple single PAM's.

The steps of manufacturing the device is discussed presently. Turning now to FIG. 5, we see the etched diamond shaped holes in quantity on a selected section of a wafer. The individual PAM's are then diced from the wafer. To this end, the wafer is preferably a monocrystalline Si wafer having a 110 plane on its top surface. This planar direction is chosen for purely illustrative purposes and it is understood that other planar orientations at variance with that chosen are within the purview of the skilled artisan and intended to be encompassed in the instant invention. To effect the structure shown, the diamond shaped holes are etched through the wafer by wet etching as described in the North, et al. reference. The side and forward pedestals, 103 and 104 respectively, as well as the standoffs 106 are formed by reactive ion etching (RIE). Details of RIE techniques can be found in *Optoelectronic Integration: Physics, Technology and Applications,* Chapter 4, p. 113–119, *Kluwer Academic Publishers,* 1994, the disclosure of which is specifically incorporated herein by reference. In production, the features made by RIE are effected first, then a mask such as $SiN_x$ which acts as a mask as well as a protective layer for the features etched by RIE. A photoresist is applied thereto the surface and the holes 501 are formed by revealing the preferred crystalline planes through the wet etching technique. Finally, the metallization patterns 107 are placed on the wafer by vacuum evaporation, sputtering or plating of conductive metals, preferably gold. At this point, the device 102 is mounted and passively aligned to the alignment features 103 and 104 and thereafter diebonded using a passive alignment diebonder. Thereafter the individual PAM's having the devices 102 mounted thereon are diced from the wafer by the use of a diamond saw.

The vertical standoffs 106 have particular application in the alignment when a VCSEL is the preferred device 102. To this end, in practice the fiber is fixed in position on the substrate 302 as described above, and the VCSEL is fixed in the x and y directions (assuming an orthogonal coordinate system) by the use of the side and forward pedestals. The height of the VCSEL in the z direction is carefully placed by the standoffs 106, as the VCSEL is bonded to the PAM with its epitaxial layer facing the fiber 110 (epi-side down), and as described above, the standoffs further have the inherent benefit to prevent solder from interfering with device emission/reception of light.

Figure 8:
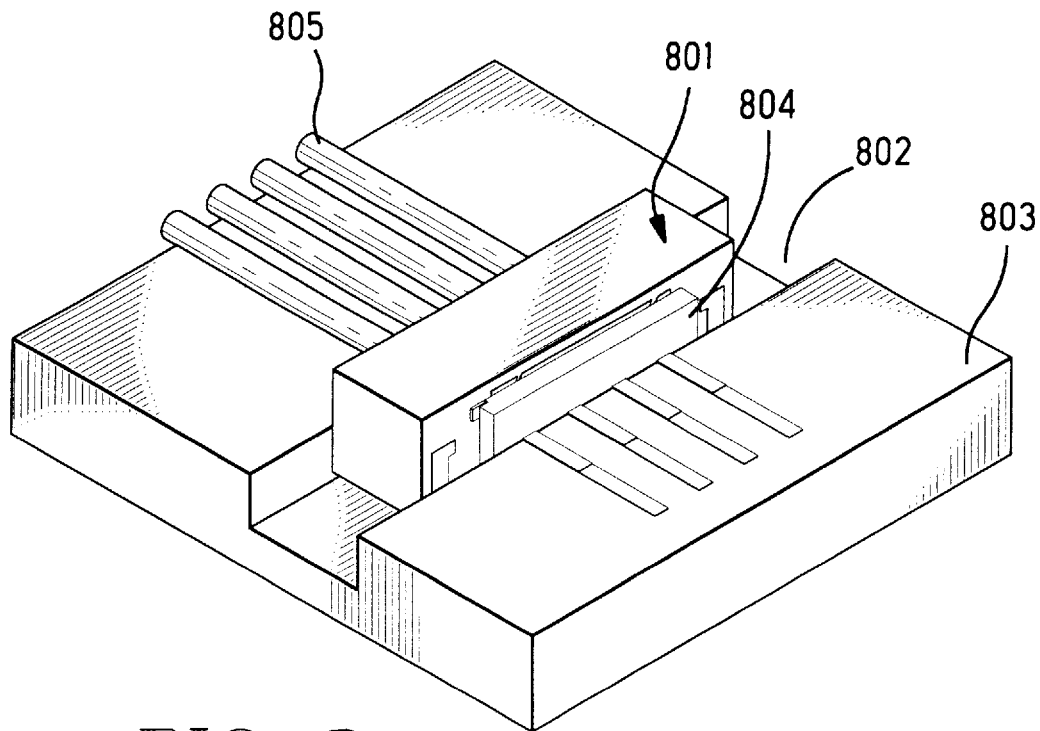
FIGS. 8 and 9 shows a perspective view of the single PAM having multiple fibers and multiple devices mounted thereon for coupling, with the PAM and fiber mounted on a substrate.
Figure 9:
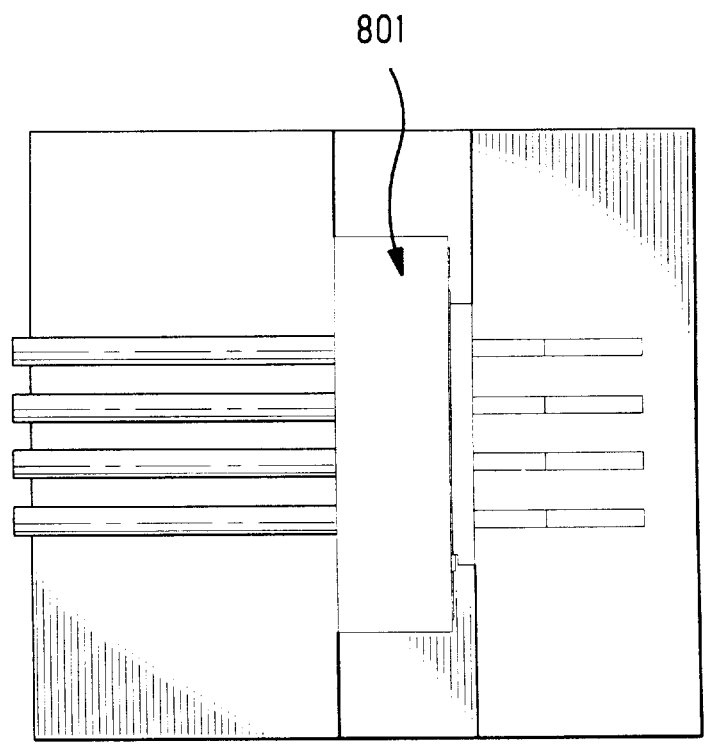
Figure 10:
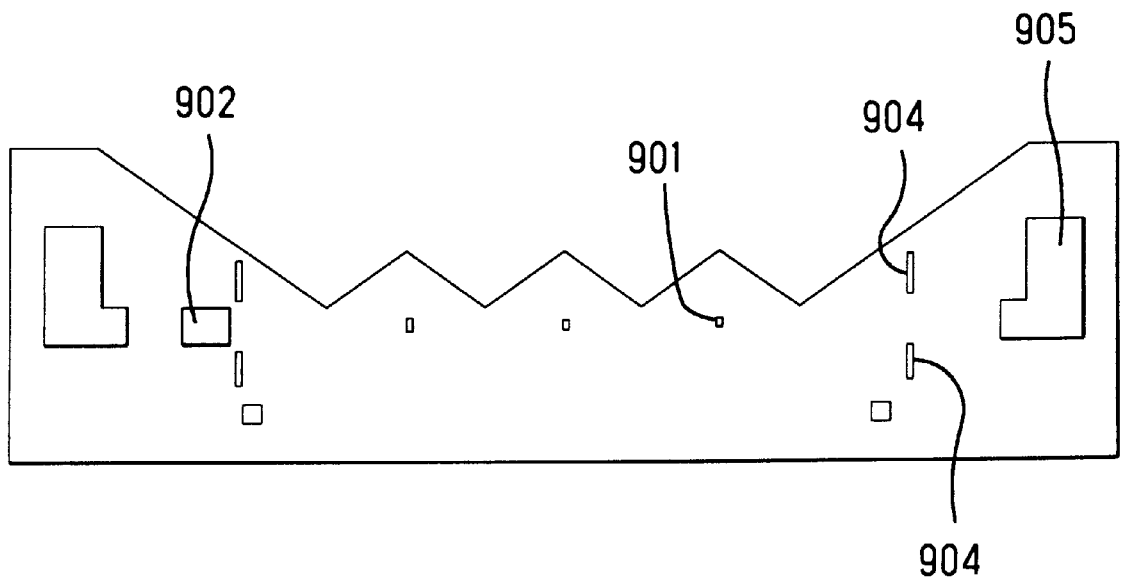
FIG. 10 is an endview of the multiple device/multiple fiber PAM.
Figure 11:
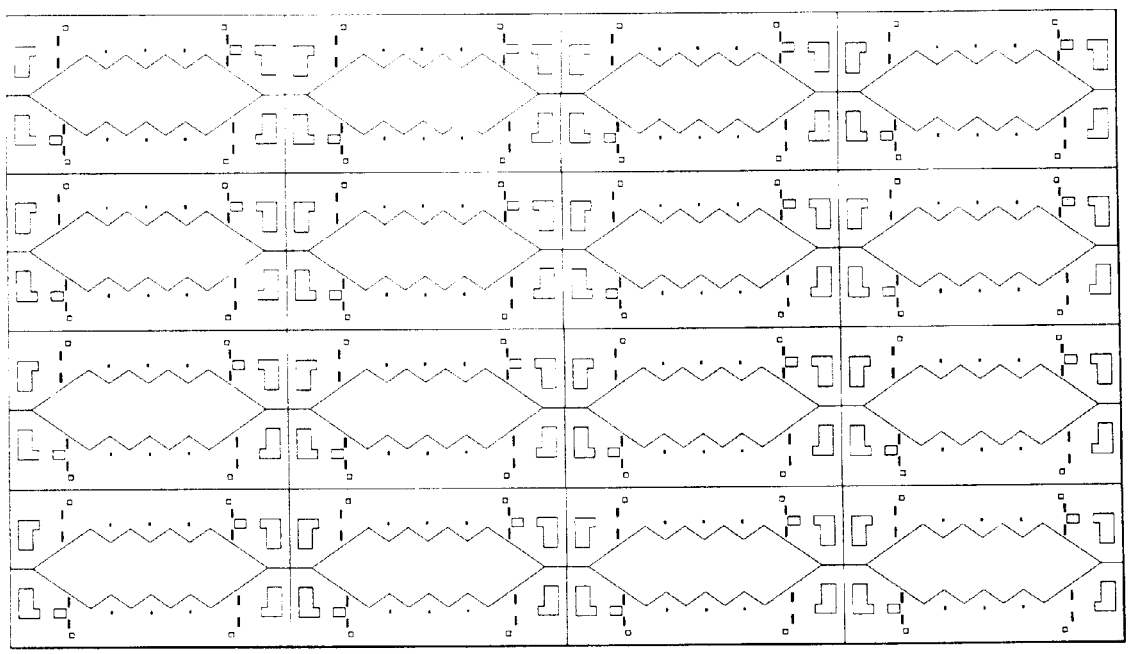
FIG. 11 is an endview of a section of wafer processed to produce a quantity of multiple fiber/multiple device PAM's.
Figure 12:
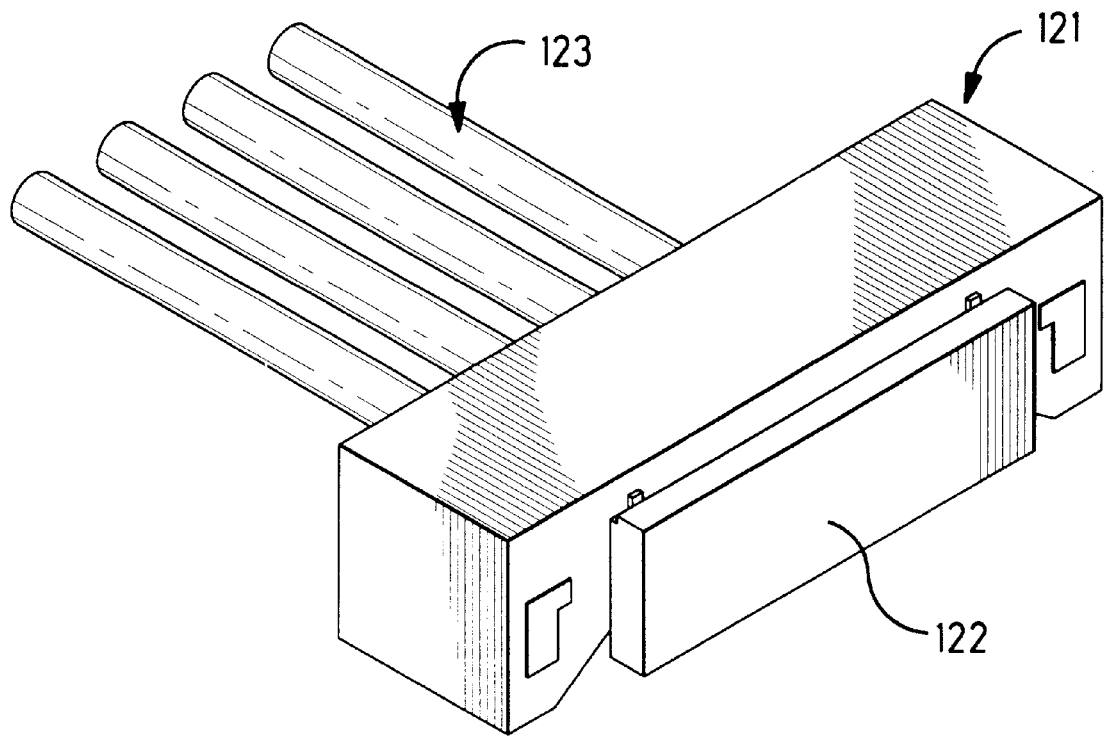
FIGS. 12 and 13 are perspective views of the multiple fiber/multiple device configuration of the present invention.
Figure 13:
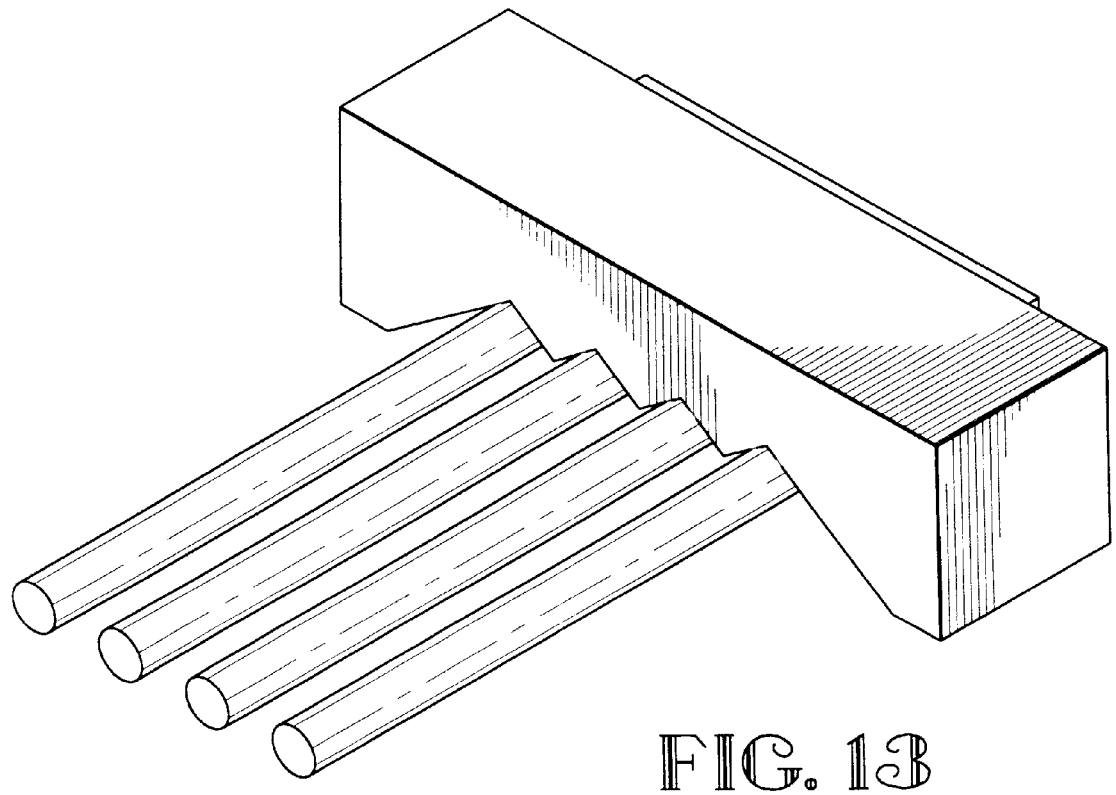

The invention having been described for a single PAM coupling a single fiber to a single surface emitting/detecting device, we now turn to the applicability and manufacture of an embodiment in which the PAM is to effect the alignment of an array of fibers and devices. This embodiment is shown in FIGS. 8–11. FIGS. 8 and 9 are a perspective and top view of an array link. To this end, a PAM 801 is disposed in groove 802 saw cut into the silicon substrate having preferably a 100 crystalline on its top surface wherein v-grooves are etched for receipt of fibers 805. The fibers are thereby aligned to an array of surface emitting/detecting devices 804. The processes and techniques for effecting the forward and side alignment pedestals and standoffs as well as the etching of the PAM are identical to that described for a single fiber/PAM/device as described above. The PAM 801 is shown on endview in FIG. 10, having forward and side alignment pedestals 901 and 902, respectively, as well as optional standoffs 904. The metallization 905 is effected as described above. Again, in large scale production, the PAM is fabricated on a wafer of (110) crystalline Si as is shown in FIG. 11, and the technique for the fabrication of the PAM, the mounting of the devices 804 and the separating of the individual array PAM are effected in an identical procedure as described above for a single PAM. FIG. 12 and 13 show the multiple fiber/multiple device configuration with the device 122 and fibers 123 mounted or the PAM 121 by forming an integral unit by techniques described for the single device/single fiber PAM as shown in FIGS. 1 and 2.

The invention having been described to be readily understood by the artisan skill, it can be appreciated that variations in material and devices to effect the passive alignment members are considered within the purview of the ordinary skilled artisan. For example, it is clearly considered within the purview of the present invention that in a multiple device/multiple fiber PAM can be used as a transceiver. Such are considered within the scope if the invention.

We claim:

1. An apparatus for coupling an optical fiber to an optical device, comprising:

a substrate having a top surface and a bottom surface, said top surface having a first groove disposed thereon for holding an optical fiber, and a second groove disposed on said top surface, said second groove being substantially orthogonal to said first groove; and a passive alignment member disposed in said second groove, said passive alignment member having selectively etched forward and side pedestals for aligning said optical device to said optical fiber disposed in said first groove.

2. An apparatus as recited in claim 1, wherein said substrate is composed of a monocrystalline material.

3. An apparatus as recited in claim 1, wherein said passive alignment member is composed of a monocrystalline material.

4. An apparatus as recited in claim 1, wherein said optical device is a VCSEL.

5. An apparatus as recited in claim 1, wherein said optical device is a photodetector.

6. An apparatus as recited in claim 1, wherein said optical device is a hologram.

7. An apparatus as recited in claim 1 wherein in said passive alignment member has at least one selectively etched vertical standoff for aligning said optical device to said optical fiber disposed in said first groove.

8. An apparatus for coupling an optical device to an optical fiber, comprising:

a substrate having a top surface and a bottom surface, said top surface having a first groove etched therein for receiving an optical fiber, and a second groove cut into said top surface in a direction substantially orthogonal to said first groove;

a passive alignment member having alignment pedestals for passively aligning an optical device onto said passive alignment member, said device being bonded to said passively alignment member; and an optical fiber disposed in said first groove, said passive alignment member having said device bonded thereto being disposed in said second groove, whereby said optical fiber and said optical device are coupled and passively aligned.

9. An apparatus as recited in claim 8, wherein said optical device is a VCSEL, and said passive alignment member further comprises selectively etched vertical standoffs for alignment of said fiber to said VCSEL.

10. An apparatus for coupling an optical fiber to an optical device, comprising:

an passive alignment member having a front surface and a rear surface, and a groove disposed therebetween; alignment pedestals disposed on said front surface for passive alignment of an optical device on said front surface; an optical fiber mounted in said groove, said optical fiber passively aligned optically with said optical device; and an optoelectronic device bonded to said passive alignment member, said optical fiber and said optoelectronic device being coupled and passively aligned, and wherein said optoelectronic device and said optical fiber are oriented orthogonally to one another.

11. An apparatus as recited in claim 10, wherein said passive alignment is made of a monocrystalline material.

12. An apparatus as recited in claim 11, wherein said groove and said alignment pedestals are selectively etched on said passive alignment member.

13. An apparatus as recited in claim 10, wherein said optical device is a VCSEL, and said PAM further comprises vertical standoffs on front surface.

14. An optical sub-assembly, comprising:

a substrate having a top surface and a bottom surface, said top surface having a first groove disposed thereon for holding a optical fiber and a second groove disposed on said top surface said second groove being substantially orthogonal to said first groove; and a passage alignment member disposed in said second groove said passive alignment member having selectively etched forward and side pedestals for aligning a photodetactor to said optical fiber disposed in said first groove.

15. An apparatus as recited in claim 14 wherein in said passive alignment member has at least one selectively etched vertical standoff for aligning said photodetector to said optical fiber disposed in said first groove.

16. An optical sub-assembly, comprising:

a substrate having a top surface and a bottom surface, said top surface having a first groove disposed thereon for holding a optical fiber and a second groove disposed on said top surface said second groove being substantially orthogonally to said first groove; and a passage alignment member disposed in said second groove said passive alignment member having selectively etched forward and side pedestals for aligning a hologram to said optical fiber disposed in said first groove.

17. An apparatus as recited in claim 16 wherein in said passive alignment member has at least one selectively etched vertical standoff for aligning said hologram to said optical fiber disposed in said first groove.

* * * * *